United States Patent Office 3,700,667
Patented Oct. 24, 1972

3,700,667
METHOD FOR MANUFACTURING PURIFIED ISOCYANURATES
Hisao Kitano, 1-6-205, 3-chome, Harima-cho, Abeno-ku, Osaka, Japan, and Fumio Tanimoto, 275 Tenjinyama-cho, Shinmachi-Higashiiru, Nishikikoji-dori, Kyoto, Japan
No Drawing. Filed Mar. 1, 1971, Ser. No. 119,939
Claims priority, application Japan, Mar. 2, 1970, 45/18,095
Int. Cl. C01d 55/38
U.S. Cl. 260—248 NS                23 Claims

ABSTRACT OF THE DISCLOSURE

A method for manufacturing purified isocyanurates, comprising contacting crude isocyanurates containing 0.01 to 10.00% by weight of impurities with a basic solution containing at least 5% by weight of a nitrogen compound having from 0 to 4 of carbon atoms at a temperature between 20 and 200° C. and under a pressure between 1.5 and 30 kg./cm.$^2$.

BACKGROUND OF THE INVENTION

The present invention relates to a method for removing impurities from crude isocyanurates, more particularly relates to a method for purifying various crude isocyanurates which have been industrially produced by known processes.

Various processes for production of isocyanurates are known in the art. The present inventors have studied about synthesis and purification of isocyanurates for many years and have reported various novel methods for production thereof in patents such as U.S. Pat. No. 3,037,979 (1962), British Pat. No. 858,810 (1961), German Pat. No. 1,124,957 (1962). Although isocyanurates are very important material for various uses such as high molecular weight material, heating medium, lubricating medium and plastifyzer, they must have high purity for such uses. Then various method for purification of isocyanurates have been reported and the present inventors also provided novel methods of purification thereof, they were disclosed in Japanese Pats. Nos. 455,077, 474,970, 505,124, 506,352 and 506,361. However still now an effective and advantageous method for removing impurities from crude isocyanurates is desirable.

SUMMARY OF THE INVENTION

It is therefore an object of this invention to provide an improved process for purification of crude isocyanurates which overcomes deficiencies in conventional methods.

It is another object of this invention to provide an effective and economical method for removing impurities from any crude isocyanurates.

It is another object of this invention to provide an improved method for removing substantially all of impurities in amount of from 0.01% to 10.00% by weight of impurities.

The above objects and others are accomplished, generally speaking, by a process according to the present invention which comprises contacting isocyanurates containing from 0.01 to 10.00% by weight om impurities with a basic solution containing at least 5% by weight of a nitrogen containing compound selected from the group consisting of ammonia, hydrazine, alkylamine, alkylhydrazine, alkenylamine, alkanol amine, alkylene amine, alkanol hydrazine and acid amide having 0 to 4 carbon atoms, at a temperature between 20 and 200° C. and under a pressure between 1.5 and 30 kg./cm.$^2$. According to a process of the present invention any impurities attached on isocyanurates can be easily removed to give extremely purified isocyanurates.

The nitrogen containing compounds selected from the group consisting of ammonia, hydrazine, alkyl amine, alkyl hydrazine, alkenyl amine, alkanol amine, alkylene amine, alkanol hydrazine and acid amide having 0 to 4 carbon atoms can be employed alone or as an admixture thereof. And common characteristics of these compounds are that they are basic, water-soluble and have a sufficient affinity to various solvents.

From lot of experiments using these nitrogen containing compounds we have found that in order to actively remove impurities from crude isocyanurates, it is necessary for these nitrogen containing compounds to have an appropriate polarity and basicity, and also carbon atoms in the molecules of these compounds should be less than 4.

Useful examples of these nitrogen containing compounds include, for example, ammonia, methyl amine, dimethyl amine, trimethyl amine, aqueous ammonia, tetramethyl ammonium hydroxide-water solution, ethyl amine, diethyl amine, propyl amine, isopropyl amine, sec.-butyl amine, tert.-butyl amine, isobutyl amine, hydrazine, hydrazine hydrate, methyl hydrazine, ethyl hydrazine, dimethyl hydrazine, diethyl hydrazine, propyl hydrazine, isopropyl hydrazine, butyl hydrazine, sec.-butyl hydrazine, tert.-butyl hydrazine, allyl amine, crotyl amine, methallyl amine, ethanol amine, diethanol amine, propanol amine, isopropanol amine, butanol amine, ethylene diamine, propylene diamine, trimethylene diamine, tetramethylene diamine, diethylene triamine, hydroxyethyl hydrazine, hydroxypropyl hydrazine, formamide, acetamide, dimethyl formamide, diethyl formamide, dimethyl acetamide, formyl ethanol amine, formyl ethylene diamine, formyl hydrazine, formamide methylol, acetamide methylol, urea or methylol urea, etc. Economically, especially advantageous compounds among aforesaid compounds are ammonia, aqueous ammonia, alcoholic ammonia, methyl amine, dimethyl amine, liquid ammonia, ethyl amine, diethyl amine, hydrazine, ethanol amine, ethylene diamine, dimethyl formamide, and urea, etc.

The nitrogen containing compound above described is used as basic solution containing at least 5% by weight of at least one of compound selected from aforesaid nitrogen containing compounds, which is prepared by adding from 5 to 100% by weight of at least one aforesaid nitrogen containing compound to neutral or basic solvent such as water, liquid ammonia, hydrazine hydrate, methanol, ethanol, isopropanol, ethylene glycol, propylene glycol, ethanol amine, ethylene diamine, tert.-amine, for example, pyridine. In the specification, 100% solution of nitrogen containing compound refers to liquid comprising liquid ammonia, hydrazine hydrate, ethanol amine or ethylene diamine which are liquid in normal condition. A concentration of said nitrogen containing compound in the basic solution is variable depending on the reaction conditions.

However we found that the purification effect of crude isocyanurates is remarkably decreased when the concentration of said nitrogen containing compound in the basic solution is less than 5% by weight.

In order to accomplish the object of the present invention, it needs to use the basic solution containing at least 5% by weight, preferably more than 15% by weight of a nitrogen containing compound selected from said group in view of aforesaid studies and logical treating time of crude isocyanurates.

Isocyanurates can be synthesized by reacting halogenohydrocarbons with alkali cyanates or alkali cyanurates, or by a rearrangement reaction of cyanurates and the like and the resulted crude isocyanurates usually contain from 0.01 to 10.00% by weight of impurities.

Said impurities include various kinds of chemical material, and usually being cyanuric acid and cyanurates, parabanic acid and parabanates, 1,3-disubstituted urea, organic carbonates, mono- or di-esters of isocyanuric acid, quaternary ammonium salts, alkyl halides, alkali halides, cyamelide, tarry materials or mixtures of these chemical material.

It is quite important for the present invention to determine the range of amount of the impurities in the crude isocyanurates which are applicable to a process of the present invention.

The present inventors have found from the results of many experiments that the content of the impurities in said crude isocyanurates should be between 0.01 and 10.00% by weight, most preferably between 0.05 and 8.00% by weight.

When the content of the impurities in said crude isocyanurates is less than 0.01% by weight or more than 10.00% by weight, the purification process of the present invention can not be carried out advantageously. So that the other process, described before, should be applied to such crude isocyanurates.

The conditions employed in the present invention were experimentally determined so as that pressure was between 1.5 and 30 kg./cm.$^2$, temperature being between 20 and 200° C. These conditions are essential in order to remove and/or decompose the impurities in crude isocyanurates.

When the pressure is less than 1.5 kg./cm.$^2$, the removing of the impurities is not effective enough. On the other hand if the pressure is unnecessarily high, i.e., more than 30 kg./cm.$^2$, it tends to accelerate a decomposition of the pure isocyanurates and therefore to decrease a yield of the pure isocyanurate. And a high pressure reactor should be used in this case so that such operation is not economically acceptable.

An acceptable pressure for the purpose of the present invention is between 1.5 and 30 kg./cm.$^2$, most preferably between 3 and 25 kg./cm.$^2$. The pressure can be induced by utilizing a vapour pressure of the nitrogen containing compounds such as ammonia and the like or said solvent of the basic solution, for example, water, alcohol or ammonia, etc., or by forcedly introducing air or nitrogen gas.

By using a suitable closed reactor, it is possible to maintain the pressure between 1.5 and 30 kg./cm.$^2$ and the temperature between 20 and 200° C., preferably between 50 and 150° C. without introduction of pressed gases.

The process of the present invention intends to remove specific amounts of impurities of crude isocyanurates. This process can be carried out in a stage of purification combined with continuous or batch system of synthesis of isocyanurates.

The process of the present invention can be conducted in a simple apparatus such as reactor system, pipe system and the like. The treating period of the process of the present invention is normally between 0.2 and 20.0 hours, and preferably between 0.5 and 5.0 hours.

After the treatment of crude isocyanurates according to the present invention, the system must be depressurized to normal pressure and the resulted purified isocyanurates must be separated from the basic solution, because the process of the present invention is conducted under the pressure. Said separation can be carried out by any way of fractionation, extraction, distillation and crystallization or an appropriate combination of these operations.

The purities of the resulting purified isocyanurates according to the present invention can be determined by elementary analysis (nitrogen content) or gas chromatography.

And the purities of the isocyanurates containing unsaturated hydrocarbons can be detected by determination of bromine number or maximum exothermic temperature of polymerization. And when the resulted purified isocyanurates have melting points, the optimal sharp points should be deemed as their purities.

The present inventors have proved a superiority of the present invention by the conduction of many experiments following the process of the present invention. It is impossible to fully describe all these experiments because the number of these experiments is huge so that the results of some experiments are hereinafter described.

DESCRIPTION OF THE PREFERRED EMBODIMENTS

The following examples are illustrative of the process of the present invention, but are not to be construed as limiting.

EXAMPLE 1

500 g. of crude triallyl isocyanurate, which contains 1.2% by weight of diallyl carbonate, 0.7% by weight of dimethyl allyl amine hydrochloride and 0.2% by weight of tarry materials, are dissolved in 1000 ml. of methanol. To the solution 300 g. of ammonia is added. And the mixture is introduced into an autoclave and allowed to stand at 100° C. under a pressure between 5 and 7 kg./cm.$^2$ for 3 hours, thereafter it is cooled. When the mixture is put into water, an oily material is layered. The oily material is collected and distilled to give trially isocyanurate with a purity of more than 99% by weight. The yield is 460 g.

EXAMPLE 2

In 700 g. of liquid ammonia 50 g. of sodium amide as a treating activator is dissolved, then 300 g. of crude triallyl isocyanurates is added as in Example 1. And the mixture is vigorously stirred in an autoclave at a temperature between 25 and 35° C. under a pressure of more than 8 atmospheric pressures for an hour. After removing the ammonia first the resulting mixture is put into 10% hydrochloric acid to separate an oily material.

The oily material is extracted with benzene. After drying the benzene solution on sodium sulfate anhydride, the mixture is distilled to give 278 g. of triallyl isocyanurate with a purity of more than 99.8% by weight.

EXAMPLE 3

A mixture of 5 g. of hydrazine hydrate (80%) 200 ml. of pyridine and 100 g. of crude trimethyl isocyanurate containing 0.8% by weight of cyanuric acid, 0.1% by weight of dimethyl parabanate and 1.1% by weight of 1,3-dimethyl urea is introduced into an autoclave and allowed to stand at 150° C. under a pressure between 5 and 6 atmospheric pressures by nitrogen gas. After cooling the resulting mixture from the autoclave is put into a cold water to give crystal. Collecting the crystal, it is recrystalled from water-methanol to give 92 g. of trimethyl isocyanurate with a purity of more than 99% by weight.

EXAMPLE 4

10 g. of crude trimethallyl isocyanurate containing 2.0% by weight of 1,3-dimethallyl urea and 3.2% by weight of cyamelide, and 20 g. of 13% aqueous ammonia are charged in a glass sealed tube, vigorously stirred at 150° C. at a pressure of 6 atm. for 5 hours, then the mixture is cooled to precipitate crystal. After filtrating the crystal it is washed with water and dried, then washed with petroleum-ether to give 9 g. of trimethallyl isocyanurate with a purity of more than 98%.

EXAMPLE 5

100 g. of crude-tri-n-amyl isocyanurate containing 0.05% by weight of n-amyl chloride is put into an autoclave altogether with 100 ml. of 25% aqueous ammonia and 50 ml. of dimethyl formamide, allowed to stand at a temperature between 80 and 90° C. at a pressure of 4 atm. for 10 hours. The mixture is cooled, poured into water, then extracted with toluene. The extract is distilled to give 95 g. of pure tri-n-amyl isocyanurate.

EXAMPLE 6

A mixture of around equivalent volume of liquid ammonia to crude triallyl isocyanurate containing 2.8% by weight of diallyl carbonate, 0.8% by weight of 1,3-diallyl urea and a trace amount of sodium chloride are passed through a steel pipe heated to 60° C. during an hour. At the time the pressure used is about 25 kg./cm.$^2$ which is caused by a size of the steel pipe and a fluidity of the materials. After cooling the mixture, the ammonia is removed, the residue is put into water. It is washed with 5% hydrochloric acid, then washed with water and fractionated to obtain an oily material. The oily material is fractionally distilled to give triallyl isocyanurate with a purity of more than 99%. The yield is about 95%.

EXAMPLE 7

100 g. of crude diallyl propyl isocyanurate containing 5.5% by weight of diallyl isocyanurate are put in 200 g. of ethanol amine containing 3% by weight of methyl amine and 3% by weight of dimethyl amine and the mixture is introduced into a pressure reactor, it is vigorously stirred at 150° C. under a nitrogen pressure of 28 atm. for 7 hours. After cooling the mixture it is extracted with benzene, the resulting extract is washed with water, then distilled to give 90 g. of diallyl propyl isocyanurate with a purity of more than 98%.

EXAMPLE 8

200 g. of crude tri-n-butyl isocyanurate containing 6.5% by weight of dimethyl dibutyl ammonium chloride and 3.2% by weight of 1,3-dibutyl urea, and 500 g. of ethylene diamine containing 5% by weight of ethyl amine and 5% by weight of diethyl amine are put in an autoclave, and allowed to react each other at a temperature between 120 and 130° C. at a nitrogen pressure of 12 atm. for an hour, the resulting mixture is cooled. The mixture is diluted with the equivalent amount of water to layer an oily material. The oily material is collected, washed with water, then distilled to give 168 g. of pure tri-n-butyl isocyanurate.

EXAMPLE 9

150 g. of crude triallyl isocyanurate containing 3.7% by weight of diallyl carbonate, 50 g. of ammonia, 10 g. of urea, and 100 g. of water are put in a pressure reactor, the mixture is vigorously stirred at a temperature between 60 and 70° C. at a pressure of 13 atm. for 2 hours, it is cooled, then the resulted precipitate is recovered and it is deeply cooled to give crystal. After filtrating the crystal it is washed with water, dried at a lower temperature under a reduced pressure to give 140 g. of triallyl isocyanurate with a purity of more than 98.5%.

EXAMPLE 10

150 g. of crude trialauryl isocyanurate containing 1.8% by weight of 1,3-dilauryl, and 50 g. of liquid ammonia are contacted in a pressure reactor at 35° C. for 3 hours, then the mixture is cooled by introducing 200 ml. of methanol to the pressure reactor. The resulting mixture is withdrawn and the ether layer is removed, the residue is redissolved in ligroin thereby recrystallizing to give 136 g. of pure trilauryl isocyanurate.

EXAMPLE 11

100 g. of crude tri-n-propyl isocyanurate containing 5% by weight of di-n-propyl carbonate are dissolved in 200 g. of ethanol containing 20% by weight of a reagent shown in Table I, the mixture is put in an autoclave, it is allowed to stand at 97° C. for 3 hours.

The autoclave is kept at 10 atm. by means of nitrogen pressure during the period of the reaction. After cooling the resulting mixture is poured into water, then extracted with benzene. The resulting extract is distilled to give pure tri-n-propyl isocyanurate. Each yield is shown in the following Table I.

TABLE I

| Reagent used: | Yield of tri-n-propyl isocyanurate (percent) |
|---|---|
| 100% hydrazine hydrate | 92 |
| Allyl amine | 89 |
| N,N-dimethyl hydrazine | 91 |
| Diethanol amine | 85 |
| Diethylene triamine | 87 |
| β-Hydroxyethyl hydrazine | 94 |

EXAMPLE 12

10 g. of tripropargyl isocyanurate containing 2.0% by weight of 1,3-dipropargyl urea, and 20 g. of 30–40% ammoniac methanol are charged in a sealed tube, the mixture is allowed to stand at a temperature between 60 and 70° C. at a pressure between 1.5 and 2.0 atm. for an hour. The resulting mixture is sufficiently cooled to precipitate crystal, then the crystal is collected and it is allowed to recrystal from methanol to give 8 g. of tripropargyl isocyanurate with a purity of more than 99%.

What is claimed is:

1. A method of manufacturing purified isocyanurate which comprises treating crude trialkyl isocyanurate containing from 0.01% to 10.00% by weight of impurities with basic solution containing at least 5% by weight of a nitrogen compound selected from the group consisting of ammonia, hydrazine, alkyl amine, alkyl hydrazine, alkenyl amine, alkanol amine, alkylene amine, alkanol hydrazine and acid amide having from 0 to 4 of carbon atoms, at a temperature between 20° C. and 200° C. and under a pressure between 1.5 kg./cm.$^2$ and 30 kg./cm.$^2$.

2. A method according to claim 1 in which the trialkyl isocyanurate is one selected from the group consisting of trimethyl isocyanurate, tripropyl isocyanurate, tributyl isocyanurate, triamyl isocyanurate and trilauryl isocyanurate.

3. A method according to claim 1 in which the nitrogen compound is ammonia.

4. A method according to claim 1 in which the nitrogen compound is hydrazine hydrate.

5. A method according to claim 1 in which the nitrogen compound is dimethyl formamide.

6. A method according to claim 1 in which the nitrogen compound is ethylamine.

7. A method according to claim 1 in which the nitrogen compound is diethylamine.

8. A method according to claim 1 in which the nitrogen compound is allylamine.

9. A method according to claim 1 in which the nitrogen compound is dimethyl hydrazine.

10. A method according to claim 1 in which the nitrogen compound is diethanolamine.

11. A method according to claim 1 in which the nitrogen compound is diethylene triamine.

12. A method according to claim 1 in which the nitrogen compound is hydroxyethyl hydrazine.

13. A method according to claim 1 in which the impurities include cyanuric acid, parabanates, dialkyl ureas, alkyl chlorides, tetraalkyl ammonium chlorides, and dialkyl carbonates.

14. A method of manufacturing purified isocyanurate which comprises treating crude isocyanurate having unsaturated hydrocarbon radical containing from 0.01% to 10.00% by weight of impurities with basic solution containing at least 5% by weight of a nitrogen compound selected from the group consisting of ammonia, hydrazine, alkyl amine, alkyl hydrazine, alkenyl amine, alkanol amine, alkylene amine, alkanol hydrazine and acid amide having from 0 to 4 of carbon atoms, at a temperature between 20° C. and 200° C., under a pressure between 1.5 kg./cm.$^2$ and 30 kg./cm.$^2$.

15. A method according to claim 14 in which the isocyanurate having unsaturated hydrocarbon radical is one selected from the group consisting of triallyl isocyanuate, trimethallyl isocyanurate, diallylpropyl isocyanurate, and tripropargyl isocyanurate.

16. A method according to claim 14 in which the nitrogen compound is ammonia.

17. A method according to claim 14 in which the nitrogen compound is methyl amine.

18. A method according to claim 14 in which the nitrogen compound is dimethyl amine.

19. A method according to claim 14 in which the nitrogen compound is ethanol amine.

20. A method according to claim 14 in which the nitrogen compound is urea.

21. A method according to claim 14 in which the impurities include diallyl carbonate, dimethyl allyl amine, hydrochloride, tarry material, dimethallyl urea, cyamelide, diallyl urea, sodium chloride, diallyl isocyanurate and dipropargyl urea.

22. A method of manufacturing purified triallyl isocyanurate which comprises treating crude triallyl isocyanurate containing from 0.01% to 10.00% by weight of impurities with basic solution containing at least 5% by weight of a nitrogen compound selected from the group consisting of ammonia, ammonia added sodium amide and urea, at a temperature between 20° C. and 100° C., under a pressure between 1.5 kg./cm.$^2$ and 30 kg./cm.$^2$.

23. A method according to claim 22 in which the basic solution is a solution selected from methanolic ammonia solution, liquid ammonia solution and aqueous ammonia solution.

References Cited
UNITED STATES PATENTS 3,065,231   11/1962   Frazier et al. _____ 260—248

JOHN M. FORD, Primary Examiner